United States Patent
Umeda et al.

(10) Patent No.: US 9,710,197 B2
(45) Date of Patent: Jul. 18, 2017

(54) STORAGE DEVICE, CONTROLLER, AND METHOD

(71) Applicant: Kabushiki Kaisha Toshiba, Minato-ku, Tokyo (JP)

(72) Inventors: Michihiko Umeda, Yokohama Kanagawa (JP); Hidekazu Masuyama, Kawasaki Kanagawa (JP); Nobuhiro Sugawara, Yokohama Kanagawa (JP); Yasuyuki Nagashima, Yokohama Kanagawa (JP); Seiji Toda, Kawasaki Kanagawa (JP); Takato Kuji, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 14/845,218

(22) Filed: Sep. 3, 2015

(65) Prior Publication Data
US 2016/0291879 A1 Oct. 6, 2016

Related U.S. Application Data

(60) Provisional application No. 62/142,120, filed on Apr. 2, 2015.

(51) Int. Cl.
*G06F 3/06* (2006.01)

(52) U.S. Cl.
CPC ............ *G06F 3/0676* (2013.01); *G06F 3/064* (2013.01); *G06F 3/0608* (2013.01); *G06F 3/0619* (2013.01)

(58) Field of Classification Search
CPC ....... G06F 3/0608; G06F 3/0676; G06F 3/064
See application file for complete search history.

(56) References Cited

U.S. PATENT DOCUMENTS

| | | | |
|---|---|---|---|
| 5,802,028 A | 9/1998 | Igarashi | |
| 6,924,952 B1 | 8/2005 | Brunnett et al. | |
| 8,402,210 B2 * | 3/2013 | Mannen | G06F 11/1076 711/113 |
| 2015/0309732 A1 * | 10/2015 | Kandasamy | G06F 3/0607 711/103 |

FOREIGN PATENT DOCUMENTS

JP 07-201138 A 8/1995

* cited by examiner

*Primary Examiner* — Edward Dudek, Jr.
(74) *Attorney, Agent, or Firm* — White & Case LLP

(57) ABSTRACT

According to one embodiment, A storage device includes a magnetic disk, a head, and a control unit. The magnetic disk includes a plurality of physical sectors having a first length. A logical block having a second length shorter than the first length, and a redundant area having a length of the difference between the first length and the second length are assigned for the physical sectors. The head reads the data from the physical sector of the magnetic disk. The control unit controls to change the second length of the logical block while maintaining the first length of the physical sector in response to reception of a change request for changing the second length of the logical block from a host.

17 Claims, 9 Drawing Sheets

| FIRST TRACK | FRIST SECTOR | SECOND SECTOR | THIRD SECTOR | ... | nTH SECTOR |
|---|---|---|---|---|---|
| SECOND TRACK | | | | | |
| THIRD TRACK | | | | | |
| ⋮ | | | ⋮ | | |
| nTH TRACK | | | | | |

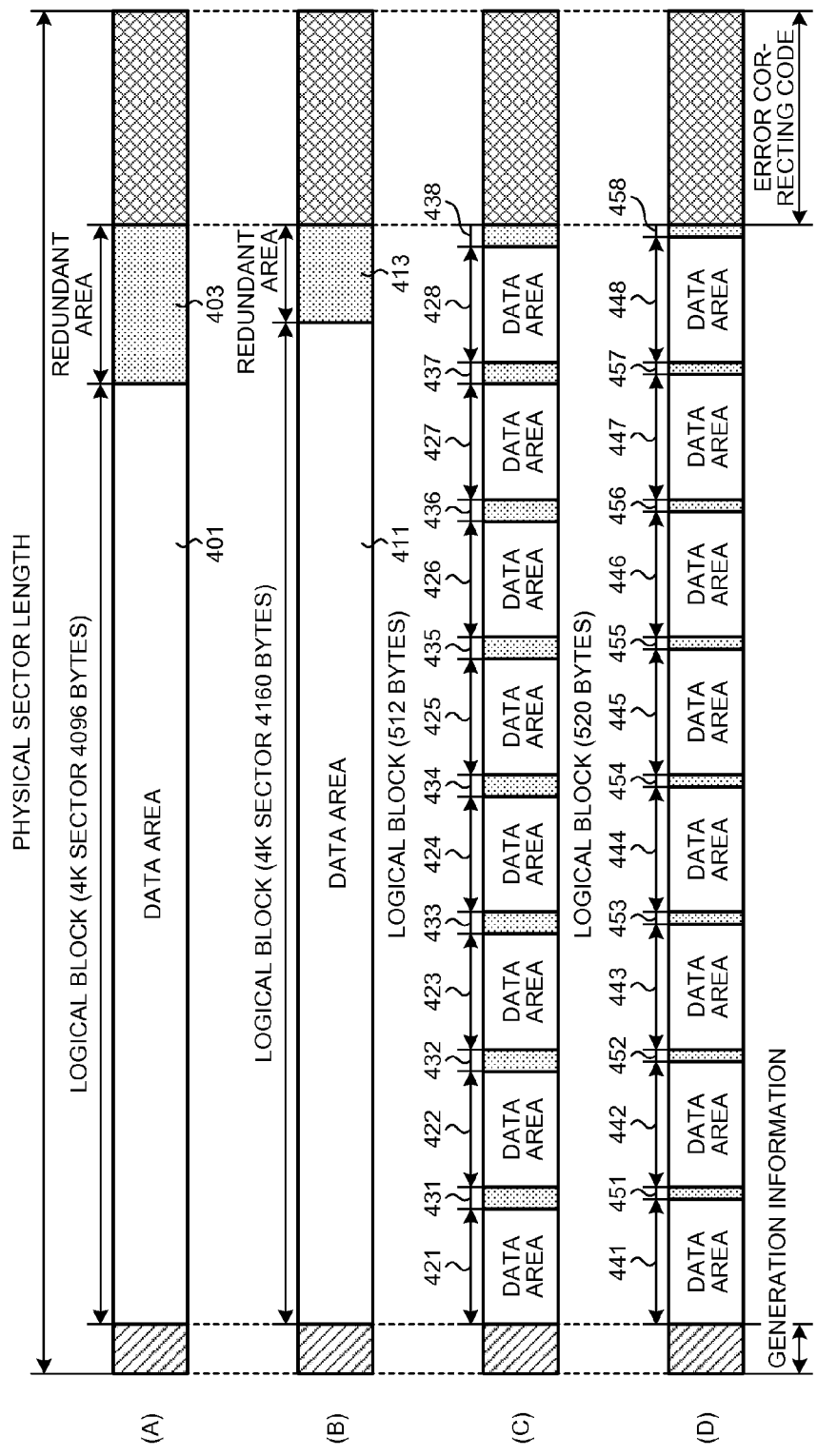

STORAGE DEVICE, CONTROLLER, AND METHOD

CROSS-REFERENCE TO RELATED APPLICATIONS

This application is based upon and claims the benefit of priority from U.S. Provisional Application No. 62/142,120, filed on Apr. 2, 2015; the entire contents of which are incorporated herein by reference.

FIELD

Embodiments described herein relate generally to a storage device, a controller and a method.

BACKGROUND

The units of data (the logical block lengths) in Hard Disk Drives (HDDs) vary depending on the intended use of the system, in addition to the unit of 4K bytes compatible with the HDDs shifted to the advanced format, and the unit of 512 bytes (512-byte emulation) for maintaining the compatibility with existing systems. When a system uses an HDD, the format change (initialization) of the HDD is required such that the logical block length of the HDD is compatible with the system.

However, the format change requires the rewriting of the recoding area of the magnetic disk. It takes time to rewrite the recoding area with the increase in capacity of the HDD.

BRIEF DESCRIPTION OF THE DRAWINGS

FIG. 3 is diagrams of an exemplary relationship between a physical sector length and a logical block according to the embodiment;

DETAILED DESCRIPTION

The storage device according to the present embodiment includes a magnetic disk, a head, and a control unit. The magnetic disk includes a plurality of physical sectors having a first length. A logical block having a second length shorter than the first length, and a redundant area having a length of the difference between the first length and the second length are assigned for the physical sectors. The head reads the data from the physical sector of the magnetic disk. The control unit controls to change the second length of the logical block while maintaining the first length of the physical sector in response to request for changing the second length of the logical block from a host.

The storage device, controller, and method according to the embodiment will be described in detail hereinafter with reference to the appended drawings. Note that the storage device, controller, and method are not limited to the embodiment.

Figure 1:
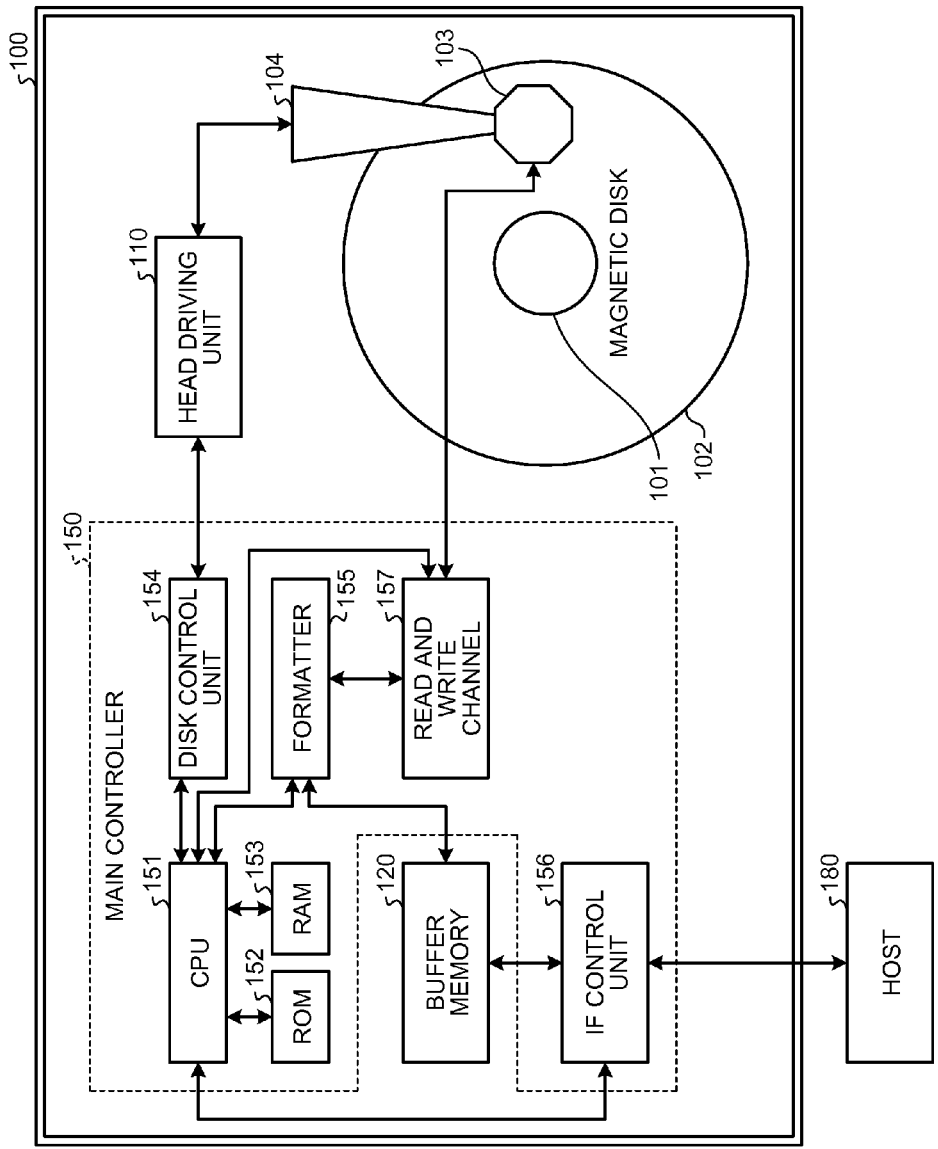
FIG. 1 is a diagram of an exemplary hardware configuration of a magnetic disk apparatus according to an embodiment.

FIG. 1 is a diagram of an exemplary hardware configuration of a magnetic disk apparatus according to the embodiment. As illustrated in FIG. 1, a magnetic disk apparatus 100 includes a spindle motor 101, a magnetic disk 102, a head 103, a head supporting unit 104, a head driving unit 110, a buffer memory 120, and a main controller 150. Then, the magnetic disk apparatus 100 reads and writes data in accordance with a request from a host 180.

The spindle motor 101 rotates the magnetic disk.

The magnetic disk 102 is rotatably fixed on the spindle motor 101. Data is read from or written to the magnetic disk 102 with the head 103 provided on a first end of the head supporting unit 104.

Figures 2A, 2B:
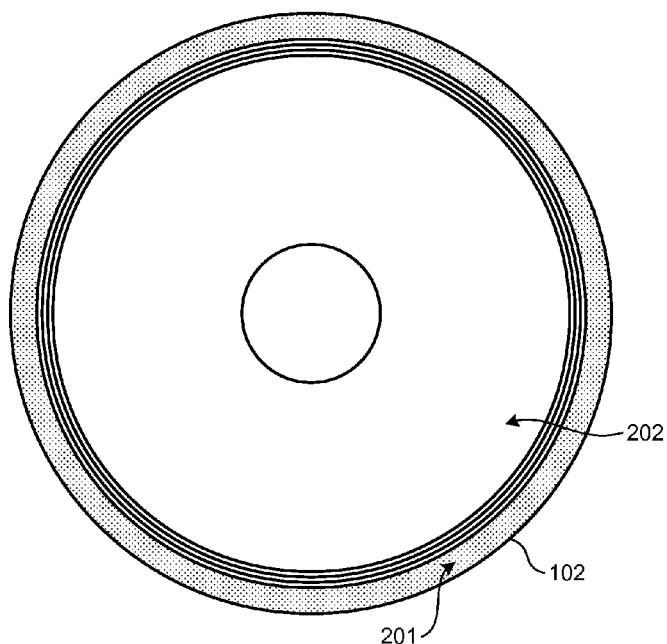
FIG. 2A is a diagram of an exemplary configuration of a magnetic disk according to the embodiment.
FIG. 2B is a diagram of an exemplary data structure of a data area in the magnetic disk according to the embodiment.

FIG. 2A is a diagram of an exemplary configuration of the magnetic disk 102 according to the embodiment. As illustrated in FIG. 2A, the magnetic disk 102 includes a system area 201 and a user data area 202. The system area 201 is configured to store the information for controlling the magnetic disk apparatus 100. The user data area 202 is configured to store user data transferred from the host 180.

FIG. 2B is a diagram of an exemplary data structure of the user data area 202 in the magnetic disk 102 according to the embodiment. As illustrated in FIG. 2B, the user data area 202 is provided with a plurality of physical sectors (a first sector, a second sector, a third sector, . . . , and an nth sector) on each of tracks (a first track, a second track, a third track, . . . , and an nth track).

With reference to FIG. 1 again, the head 103 is configured to read and write a signal or data from and to the magnetic disk 102. For example, the head 103 reads data in the unit of a physical sector of the magnetic disk 102, and writes data in the unit of a physical sector of the magnetic disk 102.

In accordance with the control from the main controller 150, the head driving unit 110 controls the head 103 through the head supporting unit 104 to move in the cross track direction of the magnetic disk 102 in a seek operation so as to change the track to be read or written.

The buffer memory 120 temporarily stores data received from the host 180 until the data is recorded in the magnetic disk 102. The buffer memory 120 temporarily stores also data read from the magnetic disk 102 until the data is transmitted to the host 180. The buffer memory 120 includes, for example, a general-purpose memory such as a Static Random Access Memory (SRAM) or a Dynamic Random Access Memory (DRAM).

The main controller 150 includes a CPU 151, a ROM 152, a RAM 153, a disk control unit 154, a formatter 155, an IF control unit 156, and a read and write channel 157.

The ROM 152 stores firmware, various applications, and various types of data necessary for executing the firmware and applications. The RAM 153 works as a main memory of the magnetic disk apparatus 100 to provide a work area in which the CPU 151 executes the firmware and applications.

The CPU 151 controls operation of each of components of the magnetic disk apparatus 100. Specifically, the CPU 151 controls the operation of each of the components of the magnetic disk apparatus 100 by sequentially reading and executing the firmware and applications stored in the ROM 152.

The disk control unit 154 controls the spindle motor 101 and gives instructions to the head driving unit 110 in accordance with requests from the CPU 151.

The formatter 155 controls the identification of the position of the physical sector and the data transfer appropriate to the logical block length so as to access the address of the logical block specified by the host 180 (hereinafter, referred to also as Logical Block Addressing (LBA)).

The formatter 155 according to the present embodiment controls the change of the logical block length while maintaining the physical sector length in response to transmit a change request for changing the logical block length of the logical block from the host 180. For example, the formatter 155 processes data such that the data is read from and written to the logical block of which logical block length is changed in the magnetic disk 102 in response to the change request from the host 180.

For example, the formatter 155 generates data appropriate to the logical block length from the data received from the host 180 (the user data) and transfers the generated data to the read and write channel 157.

The formatter 155 performs a process for adapting the data received from the read and write channel 157 to the format of the logical block, and then transfers, to the buffer memory 120, the data as the data to be transferred to the host 180.

The read and write channel 157 processes the data output from the formatter 155 in a predetermined signal process, and outputs the data to the head 103. The read and write channel 157 processes the signal or data output from the head 103 in a predetermined signal process, and outputs the signal or data to the formatter 155. The data output from the formatter 155 includes the data in the logical block having the present logical block length.

The IF control unit 156 performs a process in compliance with the interface standard between the IF control unit 156 and the host 180. For example, the IF control unit 156 outputs the commands received from the host 180 to the CPU 151, and outputs the data received from the host 180 (the user data) to the buffer memory 120. The IF control unit 156 further transmits the data read from the magnetic disk 102 and temporarily stored in the buffer memory 120 or the response from the CPU 151 to the host 180.

It is necessary in existing magnetic disk apparatuses to write the initialization data to all of the sectors in order to change the logical block length because the positions of the physical sectors or the error correcting codes vary. Meanwhile, the format takes several hours to tens of hours due to the increase in density and capacity of magnetic disks. This increases the time it takes to configure the system.

In light of the foregoing, a physical sector length applicable to a plurality of logical block lengths is set in the magnetic disk apparatus 100 according to the present embodiment. The magnetic disk apparatus 100 controls the components such that the physical sector length is not changed when the logical block length is changed. This causes the magnetic disk apparatus 100 to be available without initializing the magnetic disk 102 again when the logical block length is changed.

A physical sector length applicable to a plurality of logical block lengths is set in the magnetic disk apparatus 100 according to the present embodiment. Meanwhile, an area having a length of the difference between the physical sector length and the logical block length is set as a redundant area.

FIG. 3 is diagrams of an exemplary relationship between a physical sector length and a logical block according to the present embodiment. The examples illustrated in FIG. 3 indicate that a physical sector length is applicable to a plurality of logical block lengths.

As illustrated in FIGS. 3 (A) to 3 (D), a logical block, a redundant area, generation information, and an error correcting code are assigned for each of the physical sectors having a predetermined physical sector length in the magnetic disk 102 according to the present embodiment. The logical block length of the logical block is shorter than the physical sector length and changeable in accordance with a request from the host 180. The redundant area is an area having a length of the difference between the physical sector length and the logical block length.

The physical sector length set in the magnetic disk apparatus 100 according to the present embodiment is applicable to each of the logical block lengths of 4096 bytes (for example, in FIG. 3 (A)), 4160 bytes (for example, in FIG. 3 (B)), 512 bytes (for example, in FIG. 3 (C)), and 520 bytes (for example, in FIG. 3 (D)). The physical sector length has a value at least larger than the sum of bytes of data area of 4160 bytes, the generation information, and the error correcting code. For example, the physical sector length can have about 4800 bytes.

The logical block length according to the present embodiment is changeable in accordance with a change request for changing the logical block length from the host 180.

The generation information is a value used to identify the generation of the logical block length. The generation information is stored not only in the physical sector but also in the system area 201. The generation information in each of the physical sectors is a value used to identify the generation of the logical block length when the data is written to the physical sector. The generation information in the system area 201 is used to identify the generation of the present logical block length set in the magnetic disk apparatus 100. In other words, the generation information in the system area 201 is a count value indicating the number of changes of each of the logical block lengths. Note that, although the generation information is used as information to identify the logical block length in the present embodiment, any types of information may be used as long as the information can identify the logical block length.

For example, after receiving a change request for changing the logical block length from the host 180, the main controller 150 writes the information about the logical block length to the system area 201 and updates the generation information in the system area 201 by an increment of "one". The generation information stored in the system area 201 is updated as described above. The main controller 150 writes the information about the logical block length and updates the generation information. This achieves the change of the logical block length without changing the physical sector length.

Thus, when data is written to a physical sector, the generation information having the same value as the generation information in the system area 201 is written together with the data that is the logical block length requested in the change request to the physical sector.

This causes the magnetic disk 102 to store the generation information used to identify the logical block length when the data is stored in the logical block of each of the physical sectors.

When the main controller 150 reads data from a physical sector and determines that the generation information stored in the physical sector is identical to the generation information stored in the system area 201, the data is processed as the data written in the present logical block length.

On the other hand, when the main controller 150 reads data from a physical sector and determines that the generation information stored in the physical sector is not identical to the generation information stored in the system area 201, the main controller 150 determines that the data is written in the previous format, and controls the magnetic disk apparatus 100 such that the initialization data (for example, all of the data items are "zero") for the data in the previous format is transmitted to the host 180.

FIG. 3 (A) illustrates an exemplary internal structure of the physical sector of which logical block has 4096 bytes. As illustrated in FIG. 3 (A), the logical block of 4096 bytes holds a data area 401. A redundant area 403 is provided as the area filling in the difference between the physical sector length, and the generation information, the logical block, and the error correcting code. The data stored in the redundant area is not limited to the present embodiment. However, the initialization data, for example, in which all the data items are "zero" may be used.

As illustrated in FIG. 3 (B), the logical block of 4160 bytes holds a data area 411. A redundant area 413 is provided as the area filling in the difference between the physical sector length, and the generation information, the logical block, and the error correcting code. It can be confirmed that the redundant area 413 has a size smaller than that of the redundant area 403 in FIG. 3 (A).

As illustrated in FIG. 3 (C), a plurality of (for example, eight) logical blocks 421 to 428 is provided in a physical sector when the physical sector includes a logical block of 512 bytes. Furthermore, a plurality of (for example, eight) redundant areas 431 to 438 is provided in the physical sector.

As illustrated in FIG. 3 (D), a plurality of (for example, eight) logical blocks 441 to 448 is provided in a physical sector when the physical sector includes a logical block of 520 bytes. Furthermore, a plurality of (for example, eight) redundant areas 451 to 458 is provided in the physical sector.

As described above, the number of logical blocks provided in a physical sector is not limited to one, and a plurality of logical blocks may be provided. Regardless of the number of logical blocks, a redundant area is provided as an area filling in the difference between the physical sector length and the logical block length.

In other words, as illustrated in FIGS. 3 (A) to 3 (D), the size of the redundant area is changed in accordance with the logical block length of the logical block that the magnetic disk apparatus 100 receives. For example, every time a change request for changing the logical block length is received, the size of the redundant area is changed in accordance with the logical block length changed in accordance with the change request.

The physical sector storing each of the logical blocks is identified from the presently-set logical block length. For example, when a read request is received from the host, the position of the sector of the logical block indicated in the request may be calculated with a calculation expression for the presently-set logical block. The method for finding the physical position is not limited to a method using a calculation expression. The physical position may be identified from the database provided for each of the logical blocks (for example, a table that links each of the logical blocks to the physical position).

When receiving a read request for reading the user data from the host 180, the main controller 150 reads the data in the physical sector including the logical block through the read and write channel 157, deletes the data about the redundant area from the read data, and transfers the read data to the buffer memory 120. The read data stored in the buffer memory 120 is transmitted to the host 180.

Figure 4:
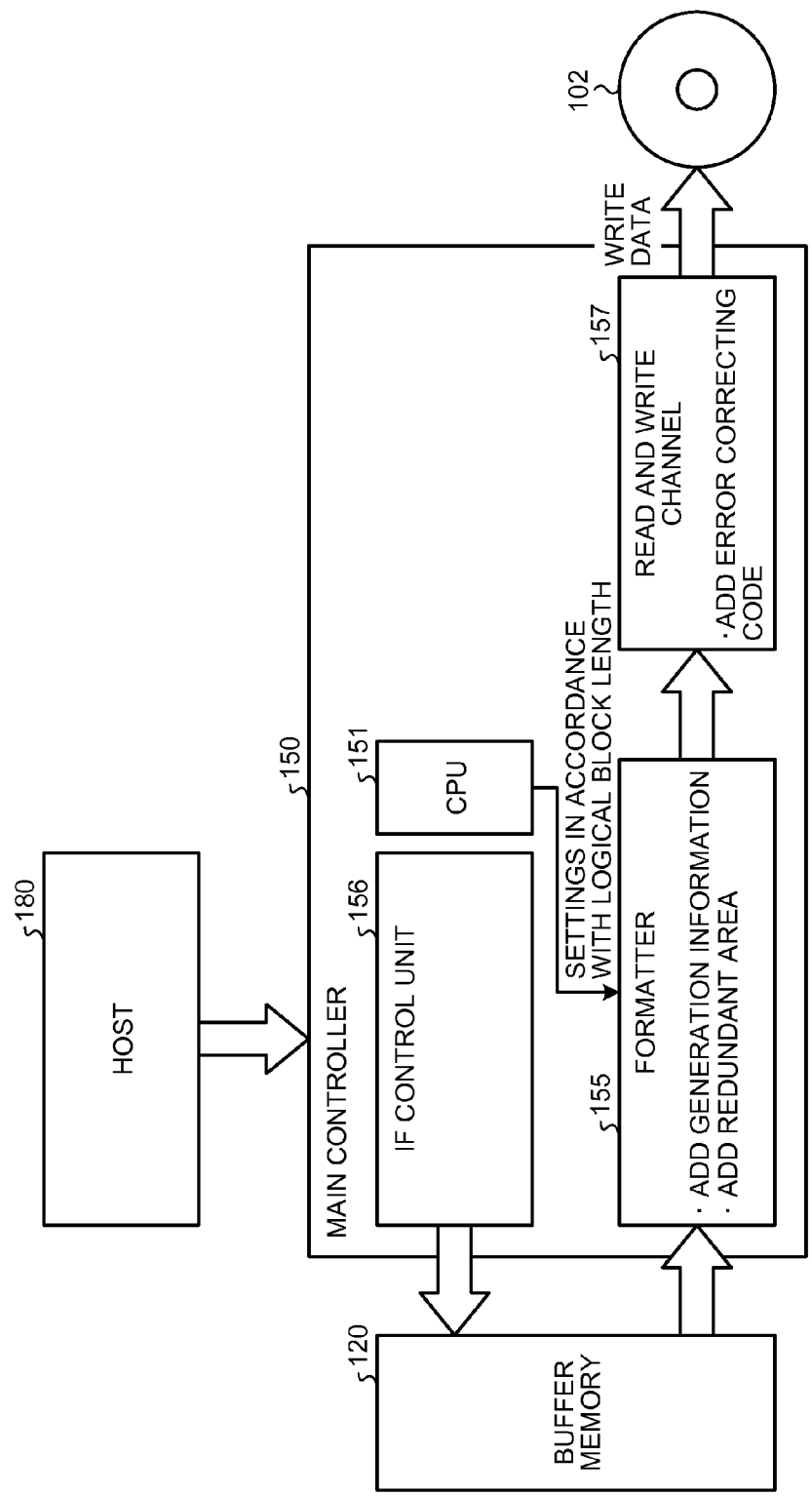
FIG. 4 is a diagram of exemplary data write control in the magnetic disk apparatus according to the embodiment.

FIG. 4 is a diagram of exemplary data write control in the magnetic disk apparatus 100 according to the present embodiment. As illustrated in FIG. 4, the IF control unit 156 writes the user data received from the host 180 to the buffer memory 120.

The CPU 151 sets the present logical block length in the formatter 155 and notifies the present generation information to the formatter 155. The setting for the present logical block length includes, for example, the positions and lengths of the redundant area and data area in the physical sector in accordance with the logical block length.

The formatter 155 adds the data of the redundant area to the data of the logical block length read from the buffer memory 120 in accordance with the present logical block length. The formatter 155 further adds the generation information to the data to which the redundant area is added. As described above, the formatter 155 according to the present embodiment can generate the data of the logical block length that is to be written to the magnetic disk 102 and that is changeable while the physical sector length is maintained.

Subsequently, the formatter 155 transmits the data to which the data of the generation information and redundant area is added to the read and write channel 157.

The read and write channel 157 writes the received data to the magnetic disk 102 after adding an error correcting code to the received data. As described above, the data illustrated in FIG. 3 is written to the magnetic disk 102. As described above, the read and write channel 157 controls the writing of the data of the logical block having the logical block length generated in the formatter 155 to the physical sector in the magnetic disk 102.

Figure 5:
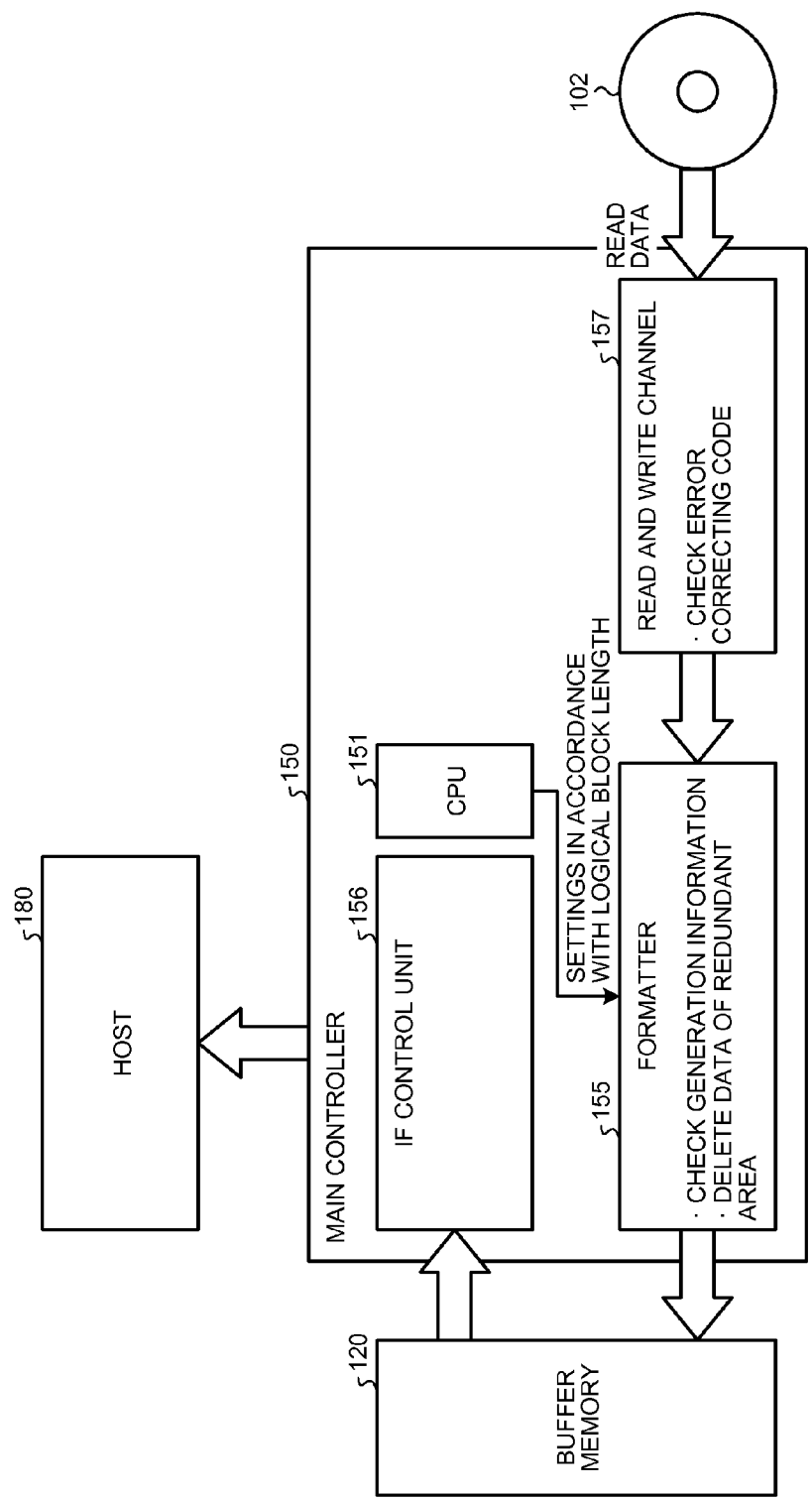
FIG. 5 is a diagram of exemplary data read control in the magnetic disk apparatus according to the embodiment.

FIG. 5 is a diagram of exemplary data read control in the magnetic disk apparatus 100 according to the embodiment. As illustrated in FIG. 5, the read and write channel 157 reads the data stored in the physical sector from the magnetic disk 102.

The read and write channel 157 detects and corrects an error in the data with the error correcting code that is given to the data.

The CPU 151 configures the setting in accordance with the present logical block length in the formatter 155, and notifies the present generation information in the system area 201 to the formatter 155. The setting in accordance with the present logical block length may include, for example, the positions or lengths of the redundant area and data area in the physical sector in accordance with the logical block length.

The formatter 155 determines whether the generation information added to the data received from the read and write channel 157 is identical to the present generation information in the system area 201. When the formatter 155 determines that the generation information added to the data is identical to the present generation information in the system area 201, the formatter 155 deletes the data of the redundant area from the received data, and writes the received data to the buffer memory 120.

The IF control unit 156 reads the data from the buffer memory 120, and transmits the data to the host 180.

Note that, when the formatter 155 determines that the generation information added to the data is not identical to the present generation information in the system area 201, the formatter 155 generates initialization data in which all of the data items are "zero", and writes the data to the buffer memory 120. The IF control unit 156 transmits the initialization data to the host 180.

Figure 6:
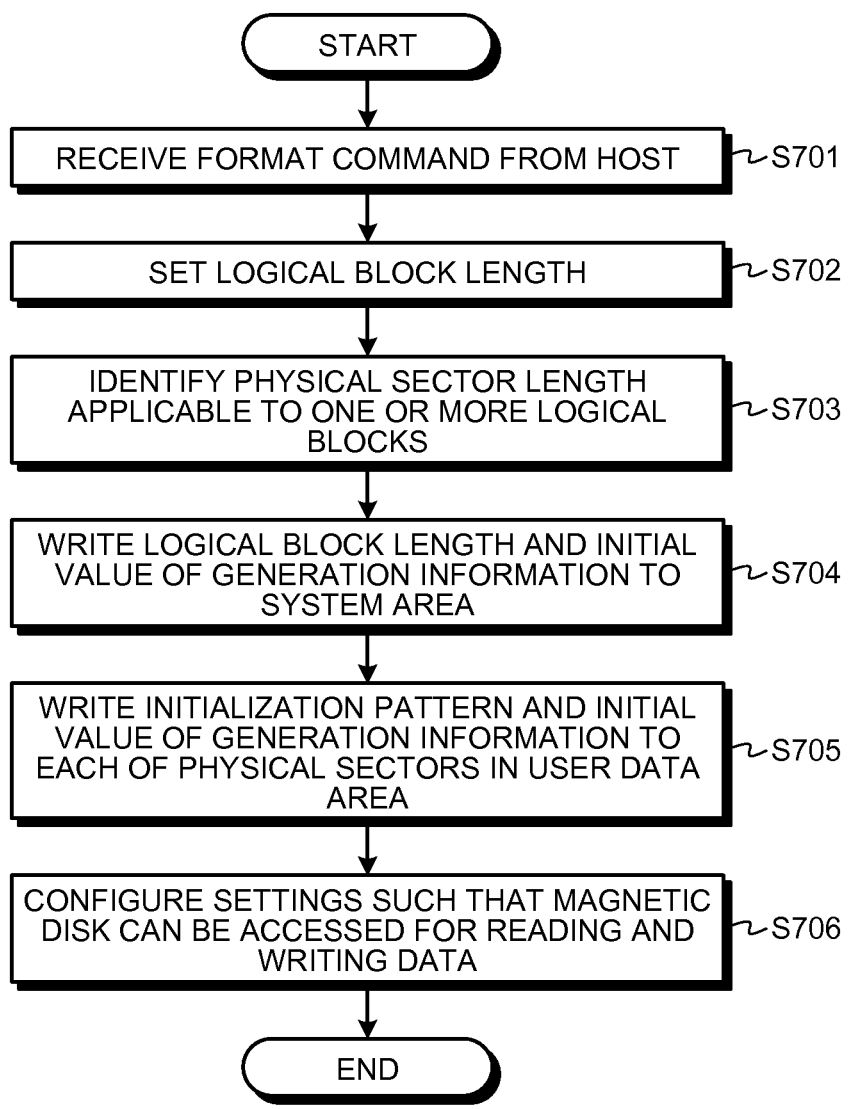
FIG. 6 is a flowchart of an exemplary process for initially formatting the magnetic disk of the magnetic disk apparatus according to the embodiment.

Next, a process for initially formatting the magnetic disk in the magnetic disk apparatus 100 according to the present embodiment will be described. FIG. 6 is a flowchart of an exemplary process for initially formatting the magnetic disk in the magnetic disk apparatus 100 according to the present embodiment.

First, the I/F control unit 156 receives a format command from the host 180 (S701).

Subsequently, the CPU 151 sets the logical block length in accordance with the format command (S702). The CPU 151 identifies a physical sector having a length applicable to one or more kind of logical blocks having the set logical block length at least, and the position of the data of the physical sector items in the physical sector (S703). The CPU 151 formats the disk through the read and write channel 157 in accordance with the physical sector length and the position of the data.

In other words, the read and write channel 157 writes the set logical block length and the initial value of the generation information to the system area 201 (S704).

The read and write channel 157 further writes the initialization pattern and the initial value of the generation information to each of the physical sectors in the user data area 202 (S705).

The CPU 151 configures the settings such that the magnetic disk 102 can be accessed for reading and writing data (S706).

The main controller 150 according to the present embodiment controls the magnetic disk apparatus 100 to write an initial value as the generation information to each of the physical sectors in the magnetic disk 102 and writes the initial value also to the generation information in the system area 201 in the process when receiving a format command from the host 180. Meanwhile, a physical sector applicable to one or more logical blocks is set on the magnetic disk 102.

Figure 7:
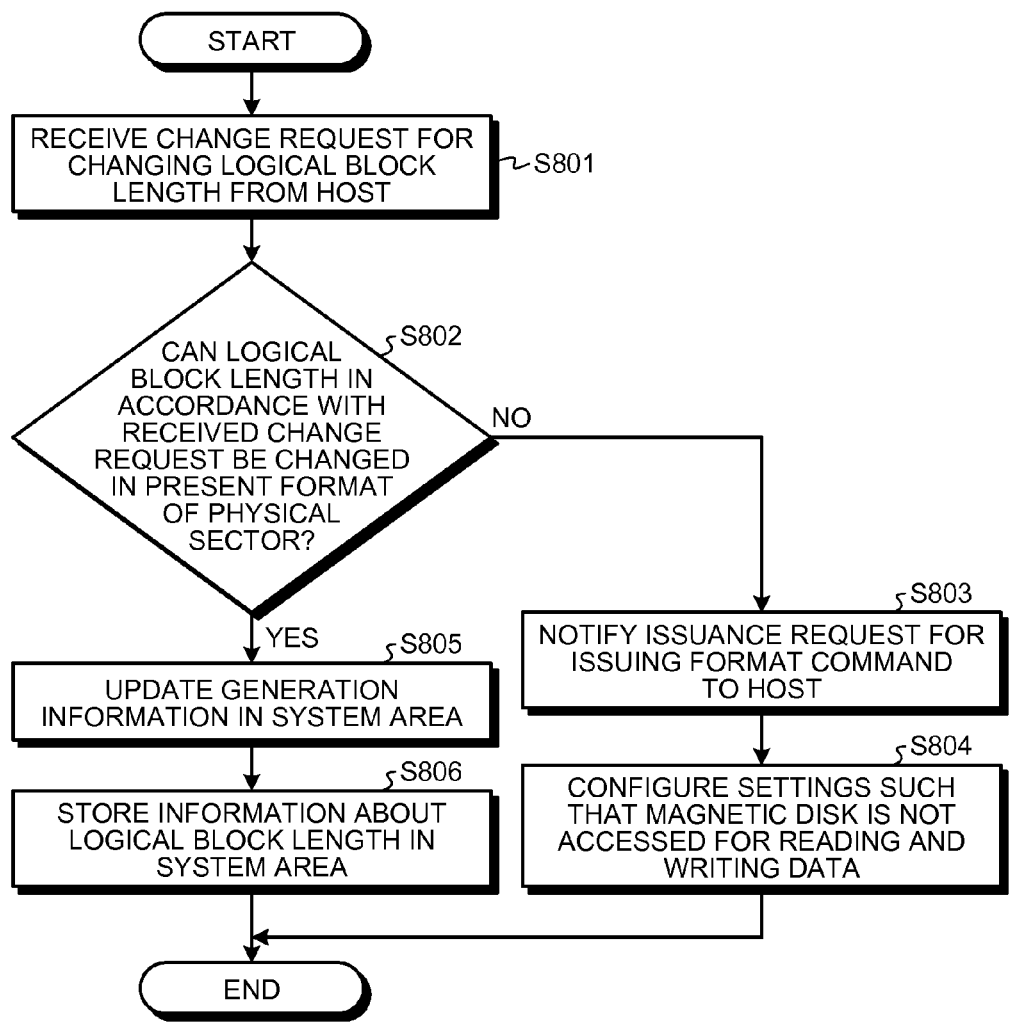
FIG. 7 is a flowchart of an exemplary process for changing a logical block length in the magnetic disk apparatus according to the embodiment.

Next, a process for changing a logical block length in the magnetic disk apparatus 100 according to the present embodiment will be described. FIG. 7 is a flowchart of an exemplary process for changing the logical block length in the magnetic disk apparatus 100 according to the present embodiment.

The I/F control unit 156 receives a change request for changing a logical block length from the host 180 (S801).

The CPU 151 determines whether the logical block length in accordance with the received change request can be changed in the present format of the physical sector (S802). When determining that the logical block length is not changed in accordance with the received change request (No in S802), the CPU 151 notifies an format request for issuing a format command to the host 180 (S803). Subsequently, the CPU 151 configures the settings such that the magnetic disk 102 is not accessed for reading and writing (S804).

On the other hand, when determining that the logical block length in the present format of the physical sector can be changed in accordance with the received change request (Yes in S802), the CPU 151 updates the generation information in the system area 201 by an increment of "one" in accordance with the change request through the read and write channel 157 (S805).

The CPU 151 stores the information about the logical block length in the system area 201 through the read and write channel 157 (S806). The information about the logical block length has the generation information at least.

The logical block length may be changed with the process in the present embodiment. This process can shorten the time to change a logical block length. Every time a change request for changing a logical block length is received, the generation information and logical block length in the system area 201 are updated. Thus, the presently-set logical block length and the generation of the logical block length may be confirmed with reference to the system area 201. When the change request for changing a logical block length is not performed in the present format of the physical sector, the issuance of a format command is requested. This can change the format into a format in which the change request for changing a logical block length may be performed.

Figure 8:
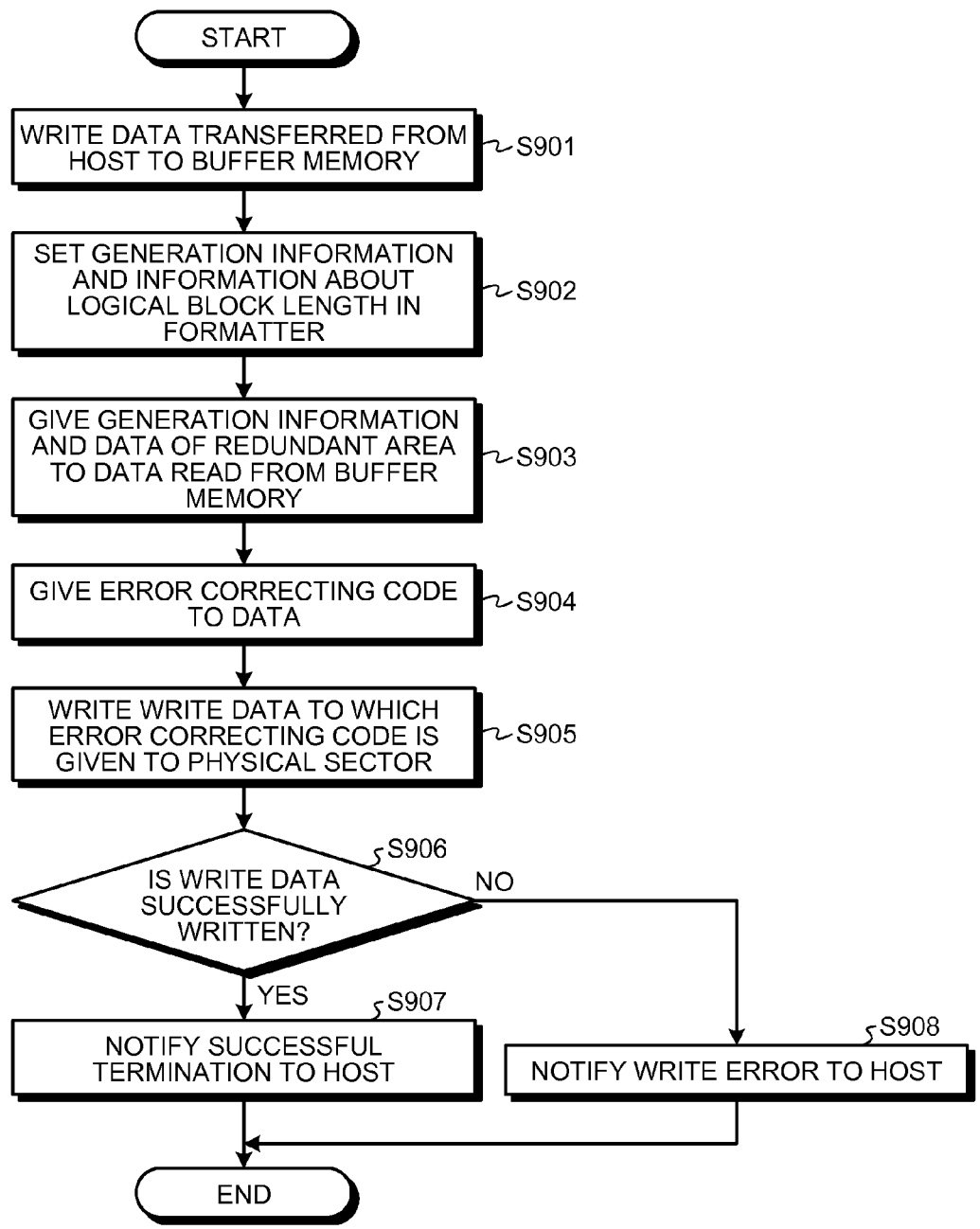
FIG. 8 is a flowchart of an exemplary process for writing data to the magnetic disk in the magnetic disk apparatus according to the embodiment.

Next, a process for writing data to the magnetic disk 102 in the magnetic disk apparatus 100 according to the present embodiment will be described. FIG. 8 is a flowchart of an exemplary process for writing data to the magnetic disk in the magnetic disk apparatus 100 according to the present embodiment.

The I/F control unit 156 writes the data transferred from the host 180 to the buffer memory 120 (S901).

The CPU 151 sets the generation information and the information about the logical block length in the formatter 155 with reference to the generation information and logical block length in the system area 201 (S902). At that time, the CPU 151 transmits, to the formatter 155, the information that is used to identify the physical sector to which the data is to be written and the position of the data in the physical sector can be identified, and that corresponds to the LBA address to which the data is to be written. This transmission enables the formatter 155 to recognize the redundant area in accordance with the logical block length, and the physical sector to which the data is to be written and the position of the data in the physical sector corresponding to the LBA address to which the data is to be written. Note that, to bring an easy understanding of the process, the generation information and the information about the logical block length is set every time a writing process is performed in the present embodiment. However, the time to set the information is not limited to the embodiment. For example, the information may be set when the magnetic disk 102 starts.

The formatter 155 adds the present generation information and the data of the redundant area appropriate to the present logical block length to the data read from the buffer memory 120 (S903). The data read from the buffer memory 120 has the logical block length The read and write channel 157 gives an error correcting code to the data to which the generation information and the data of the redundant area are added (S904).

The read and write channel 157 writes the write data to which the error correcting code is given to the physical sector (S905).

The CPU 151 determines whether the write data is written successfully from the response from the read and write channel 157 or the on-track determination of the disk control unit 154 (S906). When the CPU 151 determines that the write data is written successfully (Yes in S906), the IF control unit 156 notifies the successful termination to the host 180 (S907).

On the other hand, when the CPU 151 determines that the write data is not successfully written (No in S906), the IF control unit 156 notifies the write error to the host 180 (S908).

The process enables the main controller 150 according to the present embodiment to update the generation information stored in the physical sector with the present generation information stored in the system area 201 when writing the data to the logical block having the logical block length changed in accordance with the change request. The process further enables the main controller 150 according to the present embodiment to achieve the writing of data in accordance with the presently-set logical block length.

Figure 9:
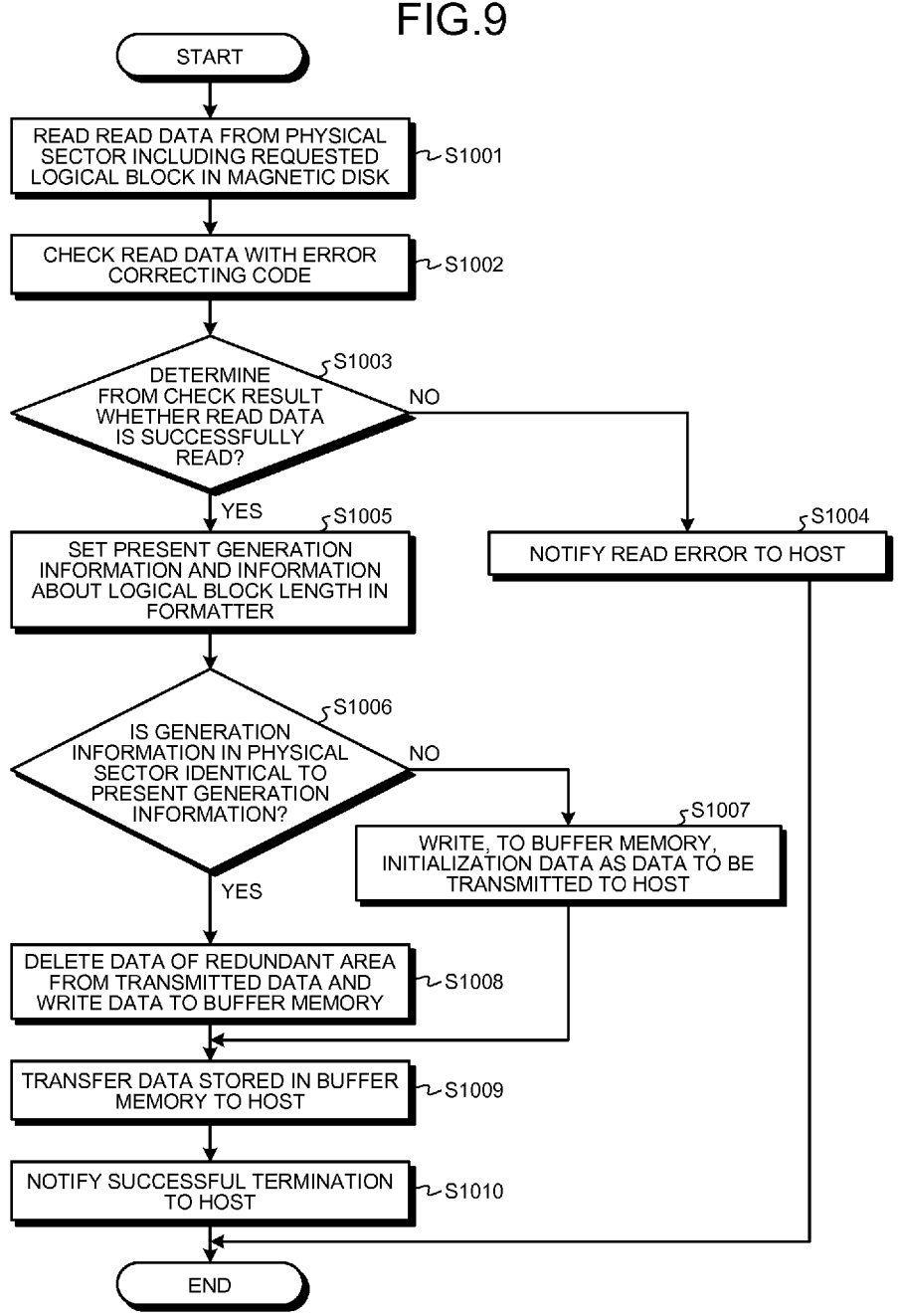
FIG. 9 is a flowchart of an exemplary process for reading data from the magnetic disk in the magnetic disk apparatus according to the embodiment.

Next, a process for reading data from the magnetic disk 102 in the magnetic disk apparatus 100 according to the present embodiment will be described. FIG. 9 is a flowchart of an exemplary process for reading data from the magnetic disk 102 in the magnetic disk apparatus 100 according to the present embodiment.

The read and write channel 157 reads the read data from the physical sector including the logical block requested from the host 180 in the magnetic disk 102 (S1001).

The read and write channel 157 checks the read data with the error correcting code added to the read data (S1002).

The CPU 151 determines from the check result whether the read data is successfully read (S1003). When the CPU 151 determines that the read data is not successfully read (No in S1003), the IF control unit 156 notifies the read error to the host 180 (S1004).

On the other hand, when the CPU 151 determines that the read data is successfully read (Yes in S1003), the CPU 151 sets the present generation information and the information about the present logical block length in the formatter 155 (S1005). The read and write channel 157 transmits the data obtained by deleting the error correcting code from the read data to the formatter 155.

Subsequently, the formatter 155 determines whether the generation information in the physical sector, namely, the generation information added to the data received from the read and write channel 157 is identical to the present generation information (S1006).

When the formatter 155 determines that the generation information in the physical sector is not identical to the present generation information (No in S1006), the formatter 155 writes, to the buffer memory 120, initialization data, for example, in which all of the data items are "zero" as the data to be transmitted to the host 180 (S1007).

On the other hand, when the formatter 155 determines that the generation information in the physical sector is identical to the present generation information (Yes in S1006), the formatter 155 deletes the generation information and the data of the redundant area from the data received from the read and write channel 157, and writes the data to the buffer memory 120 (S1008).

The IF control unit 156 transfers the data stored in the buffer memory 120 to the host 180 (S1009). The IF control unit 156 notifies the successful termination to the host 180 (S1010).

As the process described above, after the read and write channel 157 controls the reading in the physical sector of the magnetic disk 102, the main controller 150 transmits the data stored in the logical block of the physical sector in which the reading is controlled to the host 180. The main controller 150 controls the magnetic disk apparatus 100 such that the data stored in the redundant area of the physical sector in which the reading is controlled is not transmitted.

As the process described above, the main controller 150 according to the present embodiment controls the magnetic disk apparatus 100 to transmit the data read from the logical block assigned for the physical sector when the data is read from the physical sector in the magnetic disk 102, and when the generation information stored in the physical sector and the generation information stored in the system area 201 include the identical generations of the logical block length. On the other hand, the main controller 150 according to the present embodiment controls the magnetic disk apparatus 100 to transmit initialization data when the logical block lengths are not identical to each other.

Performing the process in the present embodiment transmits the data in the logical block read from the magnetic disk 102 to the host 180 when the generation information in the physical sector is identical to the generation information in the system area 201.

The above-described configuration of the magnetic disk apparatus 100 according to the present embodiment can achieve the switch of the logical block lengths without writing initialization data to the physical sector. This can achieve the reduction in load of the process for changing the block length and in time to change the block length.

An example in which the generation information in the magnetic disk apparatus 100 is stored in the system area 201 of the magnetic disk 102 is described in the present embodiment. However, the place to which the generation information is to be stored is not limited to the system area 201. The generation information may be stored in a storage unit, for example, in the ROM 152.

An example in which initialization data is transmitted when the generation information in the system area 201 is not identical to the generation information in the physical sector is described in the present embodiment. However, the data to be transmitted is not limited to the initialization data. Predetermined data may be transmitted.

The present embodiment enables the vendor of the magnetic disk apparatus to readily change the logical block length in a short time when the magnetic disk apparatus is shipped. Thus, the vendor can manage a plurality of types of magnetic disk apparatuses having different logical block lengths as a stock of a type of magnetic disk apparatuses.

The magnetic disk apparatus 100 according to the embodiment described above is provided with a redundant area as an area filling the difference of various logical block lengths in the physical sector. This can achieve the change among various logical block lengths and the use of an error detecting code for data guarantee in common without formatting all of the areas of the magnetic disk again. This makes the magnetic disk apparatus 100 available in the system without formatting all of the areas of the magnetic disk again.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A storage device comprising:
a magnetic disk including a plurality of physical sectors having a first length, a logical block and a redundant area are assigned for the physical sectors, the logical block having a second length shorter than the first length, the redundant area having a length of a difference between the first length and the second length;
a head configured to read data from the physical sector of the magnetic disk; and a control unit configured to control to change the second length of the logical block while maintaining the first length of the physical sector in response to reception of a change request for changing the second length of the logical block from a host, and to write identification information to a physical sector including a logical block having the changed second length in case of writing data to the logical block having the changed second length, the identification information being used to identify the second length.

2. The storage device according to claim 1, further comprising:
a storage unit configured to store the identification information used to identify the second length of the logical block,
wherein the control unit updates the identification information stored in the storage unit in case where the control unit receives the change request from the host.

3. The storage device according to claim 2, wherein, when the control unit reads data in the logical block from the physical sector, in case where the identification information written in the physical sector and the identification information stored in the storage unit have identical second lengths of the logical blocks, the control unit controls to transmit the data read from the logical block.

4. The storage device according to claim 2, wherein, when the control unit reads data in the logical block from the physical sector, in case where the identification information written in the physical sector and the identification information stored in the storage unit do not have identical second lengths of the logical blocks, the control unit controls to transmit predetermined data.

5. The storage device according to claim 2, wherein the control unit updates the identification information stored in the storage unit in accordance with the received change request in case where the control unit determines that changing a first logical block length into a second logical block length is possible, the second logical block length being a logical block length in accordance with the received change request.

6. The storage device according to claim 2, wherein the control unit writes an initial value to the identification information of the physical sectors and writes an initial value to the identification information stored in the storage unit in case where the control unit receives a format command from the host.

7. The storage device according to claim 1, wherein a size of the redundant area is changed in accordance with the second length changed in accordance with the change request when the control unit receives a change request for changing the second length of the logical block.

8. The storage device according to claim 1, wherein the control unit notifies an request for issuing a format command to the host in case where the control unit determines that changing a first logical block length into a second logical block length is not possible, the second logical block length being a logical block length in accordance with the received change request.

9. A controller comprising:
a first processor configured to generate data that is written to a magnetic disk including a plurality of physical sectors having a first length, a logical block and a redundant area are assigned for the physical sectors, the logical block having a second length shorter than the first length, the redundant area having a length of a difference between the first length and the second length, the second length being capable of being changed while the first length is maintained; and
a second processor configured to control writing data of the logical block having the second length to the physical sector of the magnetic disk, the data being generated in the first processing unit, and writing identification information to the physical sector including a logical block having the changed second length in case of writing the data to the logical block having the changed second length, the identification information being used to identify the second length.

10. A method that is performed in a storage device including a magnetic disk, the method comprising:
controlling to read data in a physical sector from a magnetic disk including a plurality of physical sectors having a first length, a logical block and a redundant area are assigned for the physical sectors, the logical block having a second length shorter than the first length, the redundant area having a length of a difference between the first length and the second length; and
controlling to change the second length of the logical block while maintaining the first length of the physical sector in response to reception of a change request for changing the second length of the logical block from the host, and to write identification information to a physical sector including a logical block having the changed second length in case of writing data to the logical block having the changed second length, the identification information being used to identify the second length.

11. The method according to claim 10, further comprising:
storing the identification information,
updating the stored identification information used to identify the second length of the logical block after receiving the change request from the host.

12. The method according to claim 11, further comprising:
updating the stored identification information in accordance with the change request in case where determining that changing a first logical block length into a second logical block length is possible, the second logical block length being a logical block length in accordance with the received change request.

13. The method according to claim 11, further comprising:
writing an initial value to the identification information of the physical sectors and writing an initial value to the stored identification information in case where receiving a format command from the host.

14. The method according to claim 10, further comprising:
controlling, in case where the identification information written in the physical sector and the stored identification information have identical second lengths of the logical blocks, to transmit data read from the logical block when the data in the logical block is read from the physical sector.

15. The method according to claim 10, further comprising:
Controlling, in case where the identification information written in the physical sector and the stored the identification information do not have identical second lengths of the logical blocks, to transmit predetermined data when the data in the logical block is read from the physical sector.

16. The method according to claim 10, further comprising:
   changing a size of the redundant area in accordance with the second length changed in accordance with a change request when receiving the change request for changing the second length of the logical block.

17. The method according to claim 10, further comprising:
   notifying an request for issuing a format command to the host in case where determining that changing a first logical block length into a second logical block length is not possible, the second logical block length being a logical block length in accordance with the received change request.

* * * * *